United States Patent [19]
Isono et al.

[11] Patent Number: 5,259,044
[45] Date of Patent: Nov. 2, 1993

[54] MACH-ZEHNDER OPTICAL MODULATOR WITH MONITORING FUNCTION OF OUTPUT LIGHT

[75] Inventors: Hideki Isono; Junko Watanabe; Hiroki Okushima; Tadao Shingyoji, all of Kawasaki, Japan

[73] Assignee: Fujitsu Limited, Kawasaki, Japan

[21] Appl. No.: 878,861

[22] Filed: May 5, 1992

[30] Foreign Application Priority Data

May 10, 1991 [JP] Japan ................... 3-133273

[51] Int. Cl.⁵ ............................................. G02B 6/10
[52] U.S. Cl. ................................. 385/2; 385/14; 385/31; 250/227.21; 250/227.24; 356/345
[58] Field of Search ............. 385/14, 1, 2, 3, 31; 250/227.21, 227.24; 356/345

[56] References Cited

U.S. PATENT DOCUMENTS

| | | | |
|---|---|---|---|
| 4,288,785 | 9/1981 | Papuchon et al. | 385/3 |
| 4,768,848 | 9/1988 | Vaerewyck | 385/2 |
| 5,037,180 | 8/1991 | Stone | 385/123 |
| 5,111,518 | 5/1992 | Okada | 385/14 |
| 5,119,447 | 6/1992 | Trisno | 385/3 |
| 5,138,480 | 8/1992 | Dolfi et al. | 359/251 |

Primary Examiner—Frank Gonzalez

[57] ABSTRACT

A Mach-Zehnder optical modulator with an output light monitoring function whereby emitted light from the modulator is monitored for controlling a DC bias voltage applied between a first and a second electrode provided on a first and a second branch optical waveguide. The end face of the waveguide substrate on the output side is obliquely formed and an optical waveguide is provided on the waveguide substrate for taking out reflected light from the output end face as monitor light. A photodetector for detecting the monitor light is attached to the side face of the waveguide substrate. By such arrangement, the length of the waveguide substrate can be made shorter than that in the prior art. As an alternative, such an arrangement may be made that a double refraction crystal for separating monitor light is attached to the end face on the output side of the waveguide substrate and a prism for correcting optical path is attached to the double refraction crystal.

7 Claims, 6 Drawing Sheets

MACH-ZEHNDER OPTICAL MODULATOR WITH MONITORING FUNCTION OF OUTPUT LIGHT

BACKGROUND OF THE INVENTION

1. Field of the Invention

The present invention relates to an optical modulator of Mach-Zehnder type (branch-and-interfere type) with a monitoring function of the output light.

2. Description of the Related Art

In order to increase transmission capacity of an optical communication system using a quartz optical fiber as the optical transmission line, it is effective to use a light beam with a wavelength of 1.3 $\mu$m at which the wavelength dispersion hardly occurs. On the other hand, in order to increase the repeater-to-repeater distance in the system as described above, it is effective to use a light beam with a wavelength of 1.55 $\mu$m at which the transmission loss is held down to the minimum.

Therefore, in order to increase the transmission capacity and, further, to extend the repeater-to-repeater distance in optical communication systems, it becomes necessary to use a light beam with a wavelength of 1.55 $\mu$m and to avert the effect of the wavelength dispersion by some means. As one of the arts to avert the effect of the wavelength dispersion, there is an external modulation system in which an external optical modulator is provided independently of a laser diode and laser beam from the laser diode, which constantly emits laser beam, is indirectly intensity modulated by the modulator.

Since, according to this system, the laser diode can be driven under constant conditions, it becomes possible to stabilize the lased wavelength and avert the effect of the wavelength dispersion. As one of the optical modulators to be used in practicing the external modulation system, there is a Mach-Zehnder (branch-and-interfere type) optical modulator using optical waveguides. There are demands for the optical modulators of the described type that are improved in reliability and made smaller in size.

FIG. 1 is a plan view of a prior art Mach-Zehnder optical modulator module with a monitor. On a planar waveguide substrate 10 made of LiNbO$_3$ (lithium niobate), there are formed an input-side optical waveguide 12, branch optical waveguides 14a and 14b, and an output-side optical waveguide 16 by thermal diffusion, for example, of Ti (titanium) into the substrate. The branch optical waveguide 14a is provided with a grounding electrode 18 mounted thereon and the branch optical waveguide 14b is provided with an electrode 20 for a progressive wave mounted thereon.

The input terminal 22 of the progressive-wave electrode 20 is adapted to be supplied with a modulating high-frequency signal and the output terminal 24 is provided with a terminating arrangement. With the described arrangement, when the modulating signal is input, the branched beams being in phase when divided can be given different phase changes. There are provided reflection preventing films 26 and 28 for the input end face and the output end face of the waveguide substrate 10, respectively. The waveguide substrate 10 is attached onto a board 25 for the modulator module.

Referring to FIG. 2, the output-side optical waveguide 16 is provided with an optical coupler 30 arranged by having one end portion of an optical waveguide 32 for taking out monitor light disposed close to the output-side optical waveguide 16, and the monitor light taken out by means of the optical coupler 30 is detected by a photodiode (PD) 34 provided at the other end portion of the optical waveguide 32 and converted into an electric signal.

Referring again to FIG. 1, the electric signal from the PD 34 is fed back to a modulating signal driver circuit, not shown, through terminals 36 and 38, whereby a DC bias voltage applied between the electrodes 18 and 20 is adjusted. Emitted light from a constant-polarization fiber 40 fitted to a ferrule 42 is condensed by lenses 44 and 46 and coupled to the input-side optical waveguide 12. On the other hand, the intensity modulated light emitted from the output-side optical waveguide 16 is condensed by lenses 47 and 48 and coupled to a single-mode optical fiber 50 fitted to a ferrule 52.

In operation, light emitted from the constant polarization fiber 40 is coupled to the input-side optical waveguide 12 through the lenses 44 and 46 and propagated through the branch optical waveguides 14a and 14b to be combined again in the output-side optical waveguide 16. Since the input-side optical waveguide 12 and output-side optical waveguide 16 are arranged to be single-mode optical waveguides propagating only light of the basic mode, the intensity of the output interference light is maximized when the phase difference between the branched light beams is zero and the intensity of the interference light is minimized when the phase difference is $\pi$. When the phase difference is between zero and $\pi$, the interference intensity takes on a value corresponding to the phase difference. Thus, intensity modulation of light corresponding to a modulating signal can be achieved.

Now, in the prior art optical modulator module as shown in FIG. 1 and FIG. 2, it has not been possible to reduce the radius of curvature R of the waveguide 32 for taking out monitor light so much, in view of the loss in the waveguide 32. Further, since the signal light and monitor light have been taken out in the same direction, the waveguide 32 for taking out the monitor light have had to be separated from the output-side optical waveguide 16 by a distance allowing the PD 34 to be attached to the end face of the waveguide substrate 10. Thus, there has been a disadvantage that the length of the waveguide substrate 10 becomes as long as approximately 70-80 mm.

Further, since the output end face of the waveguide substrate 10 has been formed to be perpendicular to the output-side optical waveguide 16, it has been necessary to provide the reflection preventing film 28 on the output end face of the waveguide substrate 10, in order to avert the harmful effect of the reflected light from the output end face of the waveguide substrate 10. Furthermore, when assembling the module, it has been necessary to bring the plane of polarization of the input light from the constant polarization fiber 40 into a specified relative position to the optic axis of the waveguide substrate 10 and, hence, there has been a problem that the power of the monitor light varies when the plane of polarization is misaligned in the module assembling.

SUMMARY OF THE INVENTION

Accordingly, an object of the present invention is to provide a Mach-Zehnder optical modulator module with an output-light monitoring function in smaller size and at lower cost.

In accordance with an aspect of the present invention, there is provided a Mach-Zehnder optical modulator with a monitoring function of output light comprising: a waveguide substrate having its output end face formed to be oblique to the propagating direction of signal light; an input-side optical waveguide formed on the waveguide substrate; an output-side optical waveguide formed on the waveguide substrate; a first branch optical waveguide formed on the waveguide substrate for connecting the input-side and output-side optical waveguides; a second branch optical waveguide formed on the waveguide substrate for connecting the input-side and output-side optical waveguides; a first electrode mounted on the first branch optical waveguide; a second electrode mounted on the second branch optical waveguide; means for applying voltage corresponding to a modulating signal between the first and second electrodes; an optical waveguide for taking out monitor light formed on the waveguide substrate so as to be extended in the direction of a light beam reflected from the output end face; and a photodetector provided on a side face of the waveguide substrate for detecting monitor light propagated through the optical waveguide for taking out monitor light.

Since the end face on the output side of the waveguide substrate is formed to be oblique to the output-side optical waveguide, the reflected light from the output end face can be utilized as the monitor light. Accordingly, the total length of the waveguide substrate can be made shorter than that in the prior art arrangement in which the monitor light has been taken out through an optical coupler. Further, by providing a coupler film on the obliquely-formed output end face, a desired splitting ratio can be easily obtained and, hence, the power of the monitor light can be easily maintained at a desired level.

In accordance with another aspect of the present invention, there is provided a Mach-Zehnder optical modulator with a monitoring function of output light comprising: a waveguide substrate having its output end face formed obliquely from top to bottom; an input-side optical waveguide formed on the waveguide substrate; an output-side optical waveguide formed on the waveguide substrate; a first branch optical waveguide formed on the waveguide substrate for connecting the input-side and output-side optical waveguides; a second branch optical waveguide formed on the waveguide substrate for connecting the input-side and output-side optical waveguides; a first electrode mounted on the first branch optical waveguide; a second electrode mounted on the second branch optical waveguide; means for applying voltage corresponding to a modulating signal between the first and second electrodes; a double refraction crystal attached to the output end face of the waveguide substrate; a prism for correcting optical path attached to the double refraction crystal; an optical fiber for propagating monitor light; means for coupling the monitor light emitted from the optical path correcting prism to the optical fiber; and a photodetector for detecting the monitor light propagated through the optical fiber.

According to the above described arrangement, the optical coupler which has been necessary in the prior art can be eliminated and therefore the total length of the waveguide substrate can be shortened. Further, even if there is produced misalignment of the plane of polarization at the input side of the waveguide substrate at the time of module assembling, the angle of incidence with respect to the optic axis of the double refraction crystal provided on the output side can be adjusted by rotating the double refraction crystal, and therefore, it becomes possible to adjust the power of the monitor light to a specified level.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
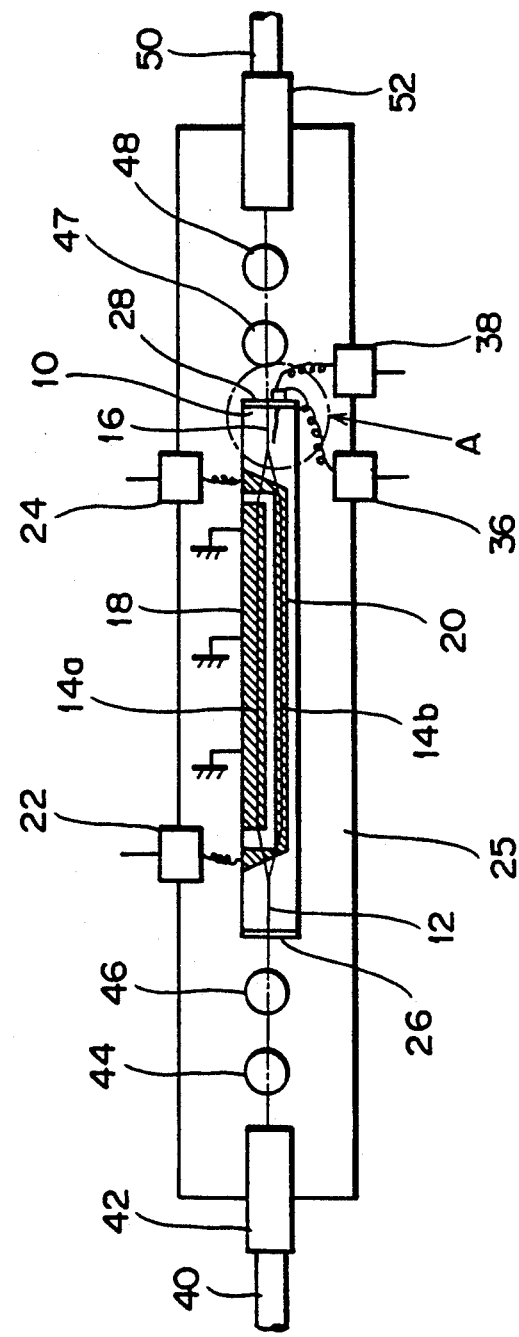
FIG. 1 is a plan view showing an overall structure of a prior art Mach-Zehnder optical modulator module.
Figure 2:
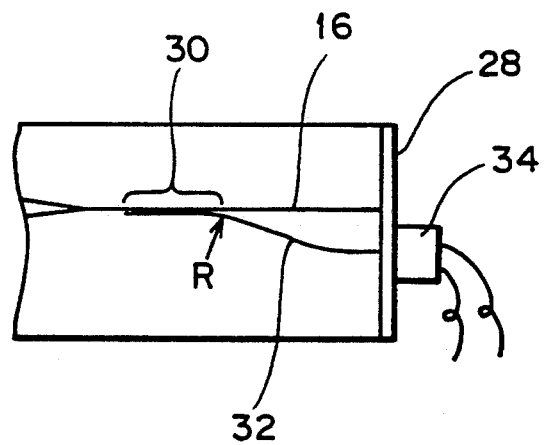
FIG. 2 is an enlarged view of the circled portion A in FIG. 1.

Preferred embodiments of the present invention will be described below in detail with reference to the accompanying drawings. In the description of the embodiments, the component parts substantially like those in the prior art structure shown in FIG. 1 are denoted by corresponding reference numerals and description thereof will be omitted to avoid duplication.

Figure 3:
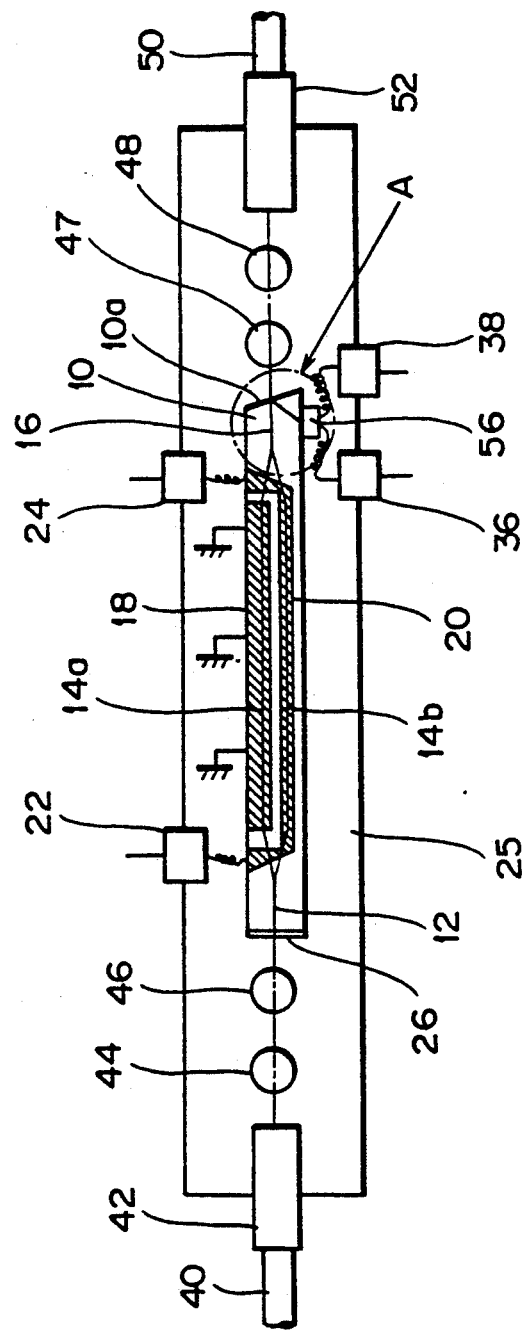
FIG. 3 is a plan view showing an overall structure of a Mach-Zehnder optical modulator module according to a first embodiment of the present invention.

FIG. 3 shows a plan view of an optical modulator module according to a first embodiment of the present invention. In the present embodiment, the output end face 10a of the waveguide substrate 10 made of LiNbO$_3$ (lithium niobate) is formed to be oblique to the output-side optical waveguide 16. The suitable angle of inclination is approximately 10° from the plane perpendicular to the output-side optical waveguide 16.

Figure 4:
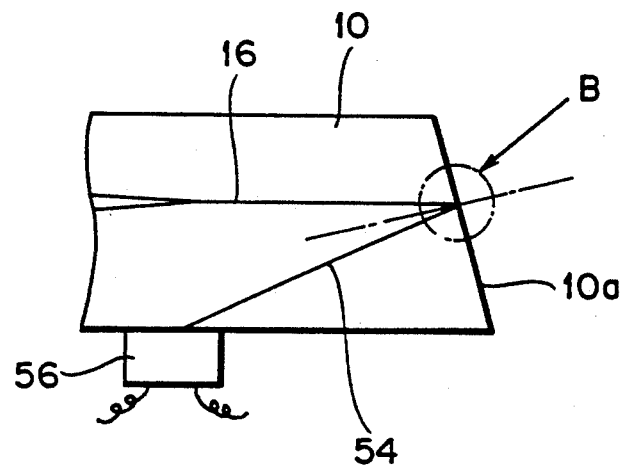
FIG. 4 is an enlarged view of the circled portion A in FIG. 3.
Figure 5:
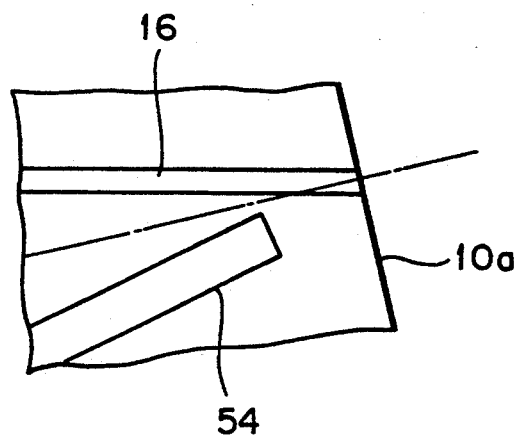
FIG. 5 is an enlarged view of the circled portion B in FIG. 4.

Then, as shown in FIG. 4, an optical waveguide 54 for taking out monitor light is formed extended in the direction of the light reflected from the output end face 10a by Fresnel reflection, and a PD 56 converting the monitor light into an electric signal is attached to the side face of the waveguide substrate 10. (The waveguide 54 may be a bent waveguide.) The waveguide 54 for taking out monitor-light is formed to be considerably broad as compared with the output-side optical waveguide 16 as shown in the enlarged view of FIG. 5 so that the reflected light from the output end face 10a of the waveguide substrate 10 can be easily admitted to the same. Other structure of the present invention is like that of the prior art shown in FIG. 1 and, therefore, its description will be omitted.

Intensity modulated light modulated according to a modulating signal is taken out through the output-side optical waveguide 16. A portion of the intensity modulated output light makes Fresnel reflection at the output end face 10a formed obliquely and propagates through the waveguide 54 to be converted into an electric signal by the PD 56. The electric signal is fed back to a modulating signal driver circuit, whereby a DC bias voltage applied between the electrodes 18 and 20 is adjusted to an optimum value. The DC bias voltage is applied for correcting a shift of the operating point of the optical modulator due to the provision of the electrode or buffer layer on the branch optical waveguides.

Figure 6:
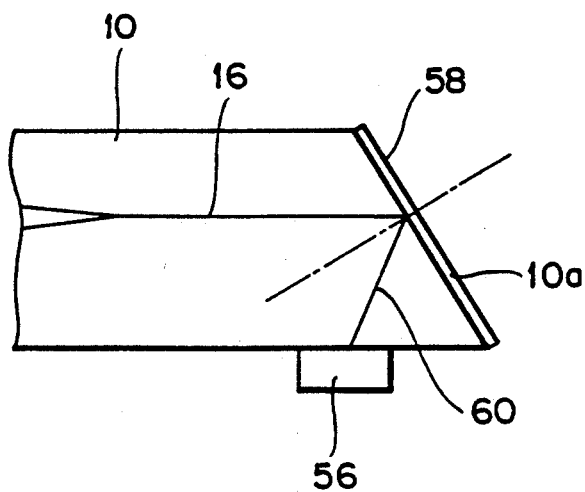
FIG. 6 is a plan view showing the principal portion of a second embodiment of the present invention.

FIG. 6 shows a plan view of the principal portion of a second embodiment of the present invention. In the present embodiment, a coupler film 58 with a desired splitting ratio is formed on the output end face 10a of the waveguide substrate formed obliquely to the output-side optical waveguide 16. By suitably setting the splitting ratio of the coupler film 58, the power of the monitor light can be changed at will. The separated light by the coupler film 58 is propagated through the waveguide 60 to be converted into an electric signal by the PD 56. Since, in the present embodiment, the coupler film 58 is formed on the end face 10a, the angle of inclination of the end face 10a can be made larger than that in the above described first embodiment, and therefore the outlet position of the waveguide 60 can be brought closer to the end face 10a.

According to the above described first and second embodiments, the monitor light is taken out by arranging such that the intensity modulated light is reflected at the output end face of the waveguide substrate. Therefore, the total length of the waveguide substrate can be made shorter than that in the prior art arrangement in which the monitor light was taken out through an optical coupler. Consequently, the optical modulator module can be made compact.

Figure 7:
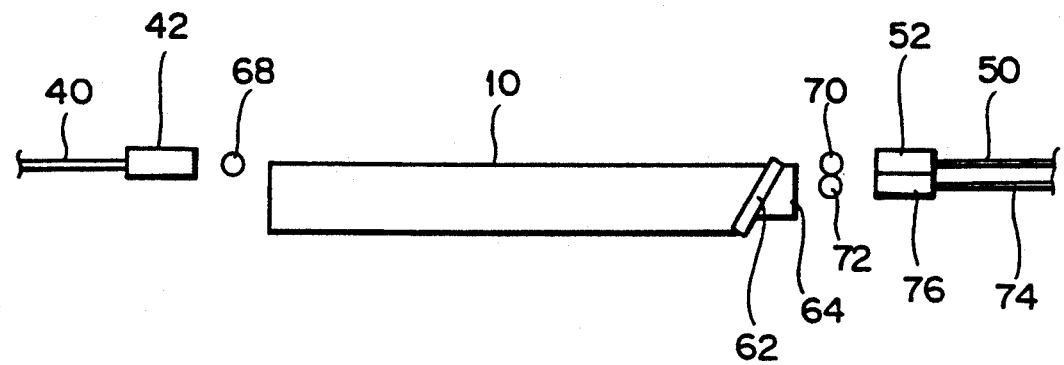
FIG. 7 is a front view schematically showing the entire structure of a third embodiment of the present invention.

Now, a third embodiment of the present invention will be described with reference to FIG. 7 and FIG. 8. On the top surface of a planar waveguide substrate 10 made of LiNbO₃, there are formed optical waveguides structured of two Y-branched waveguides in combination the same as in the first embodiment shown in FIG. 3. Light emitted from the constant polarization fiber 40 is coupled to the input-side optical waveguide formed on the waveguide substrate 10 through a lens 68. The output side of the waveguide substrate 10 is cut from top to bottom so as to have an oblique end face and there is provided a double refraction crystal 62 made of rutile or the like attached to the end face. Further, there is provided a prism 64 of LiNbO₃ for correcting optical path attached to the double refraction crystal 62.

Figure 8:
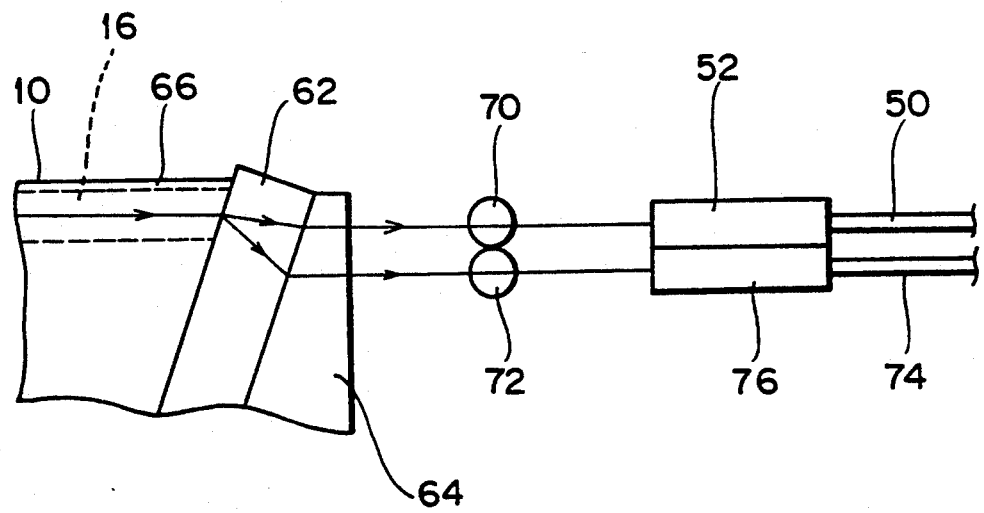
FIG. 8 is an enlarged view of the principal portion of FIG. 7.

On the waveguide substrate 10, there is formed a buffer layer 66 as shown in FIG. 8, an enlarged view of the principal portion. Intensity modulated light propagated through the output-side optical waveguide 16 is separated into an ordinary ray and an extraordinary ray by the double refraction crystal 62 and the rays from the double refraction crystal 62 are corrected for their optical paths by the optical path correcting prism 64 before they are emitted. The ordinary ray component is coupled to the single mode optical fiber 50 inserted in the ferrule 52 through a lens 70 and the extraordinary ray component is coupled to a single mode optical fiber 74 inserted in a ferrule 76 through a lens 72.

The optical fiber 50 is that for propagating the intensity modulated light, while the optical fiber 74 is that for propagating the monitor light and is provided with a PD, not shown, connected to its end.

According to the above described arrangement, the ordinary ray separated by the double refraction crystal 62 can be utilized as the in-line light, and the extraordinary ray as the monitor light, and therefore, the coupler which has been necessary in the prior art structure can be eliminated and the waveguide substrate 10 can be made shorter. Further, in the arrangement of the third embodiment, even if misalignment of the plane of polarization is produced at the input end of the waveguide substrate 10 at the time of module assembling, the angle of incidence of the intensity modulated light with respect to the optic axis of the double refraction crystal 62 provided at the output end can be changed by rotating the double refraction crystal 62, and thereby adjustment of the power of the monitor light to a specified level can be achieved.

Since the present invention has been arranged as described in detail above, the total length of the waveguide substrate can be made shorter and, hence, a Mach-Zehnder type optical modulator with a monitoring function of smaller size can be provided. Further, since the need for providing the reflection preventing film at the output end face of the waveguide substrate can be eliminated, the optical modulator module at a lower cost can be provided.

Further, in the embodiment provided with a double refraction crystal attached to the output end, even if misalignment of the plane of polarization is produced at the input end of the waveguide substrate at the time of module assembling, the angle of incidence of the intensity modulated light with respect to the optic axis of the double refraction crystal can be changed at will by rotating the double refraction crystal and thereby the power of the monitor light can be adjusted to a specified level.

We claim:

1. A Mach-Zehnder optical modulator with a monitoring function of output light, comprising:
   a waveguide substrate having an output end face formed to be oblique to the propagating direction of signal light;
   in input-side optical waveguide formed on said waveguide substrate;
   an output-side optical waveguide formed on said waveguide substrate; said output-side optical waveguide having an output end face coinciding with the output end face of said waveguide substrate;
   a first branch optical waveguide formed on said waveguide substrate and connected to said input-side and output-side optical waveguides;
   a second branch optical waveguide formed on said waveguide substrate and connected to said input-side and output-side optical waveguides;
   a first electrode mounted on said first branch optical waveguide;
   a second electrode mounted on said second branch optical waveguide;
   means for applying voltage corresponding to a modulating signal between said first and second electrodes;
   an optical waveguide for taking out monitor light formed on said waveguide substrate so as to be extended in a direction of a light beam reflected from said output end face of said output-side optical waveguide, said optical waveguide for taking out monitor light being formed to be broader than said output-side optical waveguide; and
   a photodetector positioned at a side face of said waveguide substrate so as to receive monitor light propagated through said optical waveguide for taking out monitor light.

2. A Mach-Zehnder optical modulator according to claim 1 further comprising a coupler film providing a desired splitting ratio formed on said output end face of said waveguide substrate.

3. A Mach-Zehnder optical modulator according to claim 1, wherein said first electrode is grounded and said second electrode is applied with voltage corresponding to a modulating signal.

4. A Mach-Zehnder optical modulator according to claim 1 wherein said photodetector is attached to said side face of said waveguide substrate at an end of said optical waveguide for taking out monitor light.

5. A Mach-Zehnder optical modulator with a monitoring function of output light comprising:

a waveguide substrate having an output end face formed obliquely from top to bottom;

an input-side optical waveguide formed on said waveguide substrate;

an output-side optical waveguide formed on said waveguide substrate, said output-side optical waveguide having an output end face coinciding with the output end face of said waveguide substrate;

a first branch optical waveguide formed on said waveguide substrate and connected to said input-side and output-side optical waveguides;

a second branch optical waveguide formed on said waveguide substrate and connected to said input-side and output-side optical waveguides;

a first electrode mounted on said first branch optical waveguide;

a second electrode mounted on said second branch optical waveguide;

means for applying voltage corresponding to a modulating signal between said first and second electrodes;

a double refraction crystal attached to said output end face of said waveguide substrate;

a prism for correcting optical path attached to said double refraction crystal;

an optical fiber for propagating monitor light;

means for coupling the monitor light emitted from said optical path correcting prism to said optical fiber; and a photodetector positioned to said substrate so as to receive the monitor light propagated through said optical fiber.

6. A Mach-Zehnder optical modulator according to claim 5, wherein said double refraction crystal is a rutile crystal and said optical path correcting prism is made of $LiNbO_3$.

7. A Mach-Zehnder optical modulator according to claim 5, wherein said photodetector is attached to a side face of said waveguide substrate at an end of said optical fiber for propagating the monitor light.

* * * * *